United States Patent
Diao et al.

(10) Patent No.: US 12,074,898 B1
(45) Date of Patent: Aug. 27, 2024

(54) ADAPTIVE ACTIONS FOR RESPONDING TO SECURITY RISKS IN COMPUTER NETWORKS

(71) Applicant: Trend Micro Incorporated, Tokyo (JP)

(72) Inventors: Lili Diao, Nanjing (CN); Zhijie Li, Nanjing (CN); ZhengBao Zhang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 223 days.

(21) Appl. No.: 17/588,557

(22) Filed: Jan. 31, 2022

(51) Int. Cl.
*H04L 29/00* (2006.01)
*H04L 9/40* (2022.01)

(52) U.S. Cl.
CPC ........ *H04L 63/1433* (2013.01); *H04L 63/102* (2013.01); *H04L 63/105* (2013.01); *H04L 63/205* (2013.01)

(58) Field of Classification Search
CPC . H04L 63/1433; H04L 63/102; H04L 63/105; H04L 63/205
See application file for complete search history.

(56) References Cited

U.S. PATENT DOCUMENTS

| | | | | |
|---|---|---|---|---|
| 10,868,825 B1* | 12/2020 | Dominessy | ............ | H04L 43/045 |
| 11,184,403 B1* | 11/2021 | Wu | ............ | H04L 67/10 |
| 11,336,698 B1* | 5/2022 | Wu | ............ | G06F 21/54 |
| 11,444,871 B1* | 9/2022 | Nainar | ............ | H04L 45/70 |
| 11,457,024 B2* | 9/2022 | Bindal | ............ | G06Q 10/0635 |
| 11,694,775 B1* | 7/2023 | Maier | ............ | G06Q 10/10 705/2 |
| 11,818,101 B2* | 11/2023 | Santuka | ............ | H04L 63/108 |
| 2017/0098087 A1* | 4/2017 | Li | ............ | H04L 63/1416 |
| 2017/0099311 A1* | 4/2017 | Kesin | ............ | H04L 67/535 |
| 2017/0195354 A1* | 7/2017 | Kesin | ............ | H04L 67/535 |
| 2019/0007441 A1* | 1/2019 | Kesin | ............ | H04L 63/083 |
| 2020/0045064 A1* | 2/2020 | Bindal | ............ | G06N 20/00 |
| 2021/0105294 A1* | 4/2021 | Kruse | ............ | H04L 63/145 |
| 2021/0293130 A1* | 9/2021 | Revheim | ............ | E21B 44/00 |
| 2022/0078209 A1* | 3/2022 | V | ............ | H04L 63/105 |
| 2022/0103594 A1* | 3/2022 | Galloway | ............ | H04L 63/205 |
| 2022/0103597 A1* | 3/2022 | Gobena | ............ | H04L 63/0236 |

(Continued)

OTHER PUBLICATIONS

Wikipedia—Secure Access Service Edge, 7 sheets [retrieved on Sep. 29, 2021], retrieved from the internet: https://en.wikipedia.org/wiki/Secure_Access_Service_Edge.

(Continued)

*Primary Examiner* — Don G Zhao
(74) *Attorney, Agent, or Firm* — Beyer Law Group LLP

(57) ABSTRACT

System and method for taking actions to mitigate security risks in a computer network are disclosed. The costs of security events and taking actions to block permissions granted to users are defined. For each of the users, prediction models are created, one for each of the security events. Using prediction models of a selected user, predictions on whether the security events will occur and/or predictions of severity if the security events actually occur are generated. For the selected user, an action list that indicates whether or not to take actions to block particular permissions granted to the selected user is generated based at least on the predictions, costs of the events, and costs of the permissions.

8 Claims, 5 Drawing Sheets

(56) References Cited

U.S. PATENT DOCUMENTS

| | | | |
|---|---|---|---|
| 2022/0108402 A1* | 4/2022 | Jalal | G06N 5/01 |
| 2022/0188733 A1* | 6/2022 | Wang | G06N 5/04 |
| 2023/0114774 A1* | 4/2023 | Santuka | H04L 63/107 |
| 2023/0230126 A1* | 7/2023 | Habibabadi | G06Q 30/0255 |
| | | | 705/14.53 |

OTHER PUBLICATIONS

Security Operations Teams Get Relief From Alert Overload with the Trend Micro Vision One Platform—News provided by Trend Micro Incorporated, Feb. 9, 2021, 3 sheets.

Symantec Risk Insight—Being better prepared means better protected Data Sheet, Apr. 2016, 2 sheets.

\* cited by examiner

|    |                              | p1 Upload | p2 Download | p3 Send Email | p4 Receive Email | p5 Logon Account | p6 Share | p7 Web Connection |
|----|------------------------------|-----------|-------------|---------------|------------------|------------------|----------|-------------------|
| e1 | Cloud App Reputation         | 1         | 1           | 0             | 0                | 1                | 0        | 1                 |
| e2 | Suspicious Account Activity  | 1         | 1           | 1             | 1                | 1                | 1        | 0                 |
| e3 | High Risk Account Activity   | 0         | 0           | 1             | 0                | 1                | 1        | 0                 |
| e4 | Leaked Account Activity      | 0         | 0           | 0             | 0                | 1                | 0        | 0                 |
| e5 | Web Suspicious Activity      | 1         | 1           | 0             | 0                | 1                | 1        | 1                 |
| e6 | Email Suspicious Activity    | 0         | 0           | 1             | 1                | 0                | 0        | 0                 |
| e7 | Mobile Suspicious Activity   | 1         | 1           | 0             | 0                | 1                | 0        | 1                 |
| e8 | Endpoint Suspicious Activity | 1         | 1           | 0             | 0                | 1                | 1        | 1                 |
| e9 | Anomaly Network Traffic      | 1         | 1           | 0             | 0                | 0                | 0        | 0                 |

FIG. 2

ADAPTIVE ACTIONS FOR RESPONDING TO SECURITY RISKS IN COMPUTER NETWORKS

TECHNICAL FIELD

The present invention is generally directed to cybersecurity and computer networks.

BACKGROUND

Secure Access Service Edge (SASE) is a cloud-delivered service that combines network and security functions with Wide Area Network (WAN) capabilities to support the dynamic, secure access needs of today's hybrid organizations. Conceptually, SASE extends networking and security capabilities beyond where they are typically available. This allows users of an organization, regardless of their physical location, to take advantage of firewall as a service (FWaaS), secure web gateway (SWG), zero-trust network access (ZTNA), and a medley of threat detection functions. SASE services are commercially-available from cybersecurity vendors, including Trend Micro, Incorporated.

A SASE service may include a risk insight system for evaluating an organization's vulnerability to phishing, ransomware, Business Email Compromise (BEC), Advanced Persistent Threat (APT), password spray, denial of service, unauthorized intrusion, malware infection, spam, and other cyber threats, which are also referred to herein as "security risks". The risk insight system collects activity, status, and detection information from a variety of sensors deployed at various nodes, such as a Cloud Access Security Broker (CASB), Secure Web Gateway (SWG), etc. The risk insight system employs expert rules, machine learning algorithms, and other risk analysis algorithms to assess security risks that may be detected with the collected information. The risk insight system may generate a risk score based on one or more detected security risks. When the risk score exceeds a risk threshold, the SASE service takes an action to mitigate the security risk.

A risk score is a measure of severity of a security risk. In conventional SASE services, actions are taken in accordance with manually-generated (e.g., by network personnel) rules that are based on risk scores or other indicators of security risks. Examples of these rules include blocking all permissions of any user or device with a risk score that exceeds a risk threshold, blocking all permissions of any user or device that caused a particular security event, blocking all permissions of any user or device that exhibits anomalous behavior, etc. These rules for taking actions can be tedious to generate and maintain, can be inaccurate and rigid, can lead to a high rate of false alarms, and can unnecessarily inconvenience the users.

BRIEF SUMMARY

In one embodiment, a method of mitigating security risks in a computer network includes defining event costs of security events and defining action costs of taking actions to block permissions granted to users of the computer network. For each of the users, prediction models are created, one for each of the security events. Predictions on whether the security events will occur and/or predictions of severity if the security events actually occur are made using prediction models of a selected user. For the selected user, an action list that indicates whether or not to take actions to block particular permissions granted to the selected user is generated based at least on the predictions, event costs, and action costs.

In another embodiment, a computer system comprises at least one processor and a memory, the memory storing instructions that when executed by the at least one processor cause the computer system to: store definitions of event costs of security events; store definitions of action costs of taking actions to block permissions granted to users of the computer network; for each of the users, train prediction models, one for each of the security events; generate, using prediction models of a selected user, predictions as to whether the security events will occur and/or predictions of severity if the security events actually occur; and for the selected user, generate an action list that indicates whether or not to take actions to block particular permissions granted to the selected user based at least on the action costs, event costs, and predictions made using the prediction models of the selected user.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 shows a table that illustrates an example correspondence between permissions and security events in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
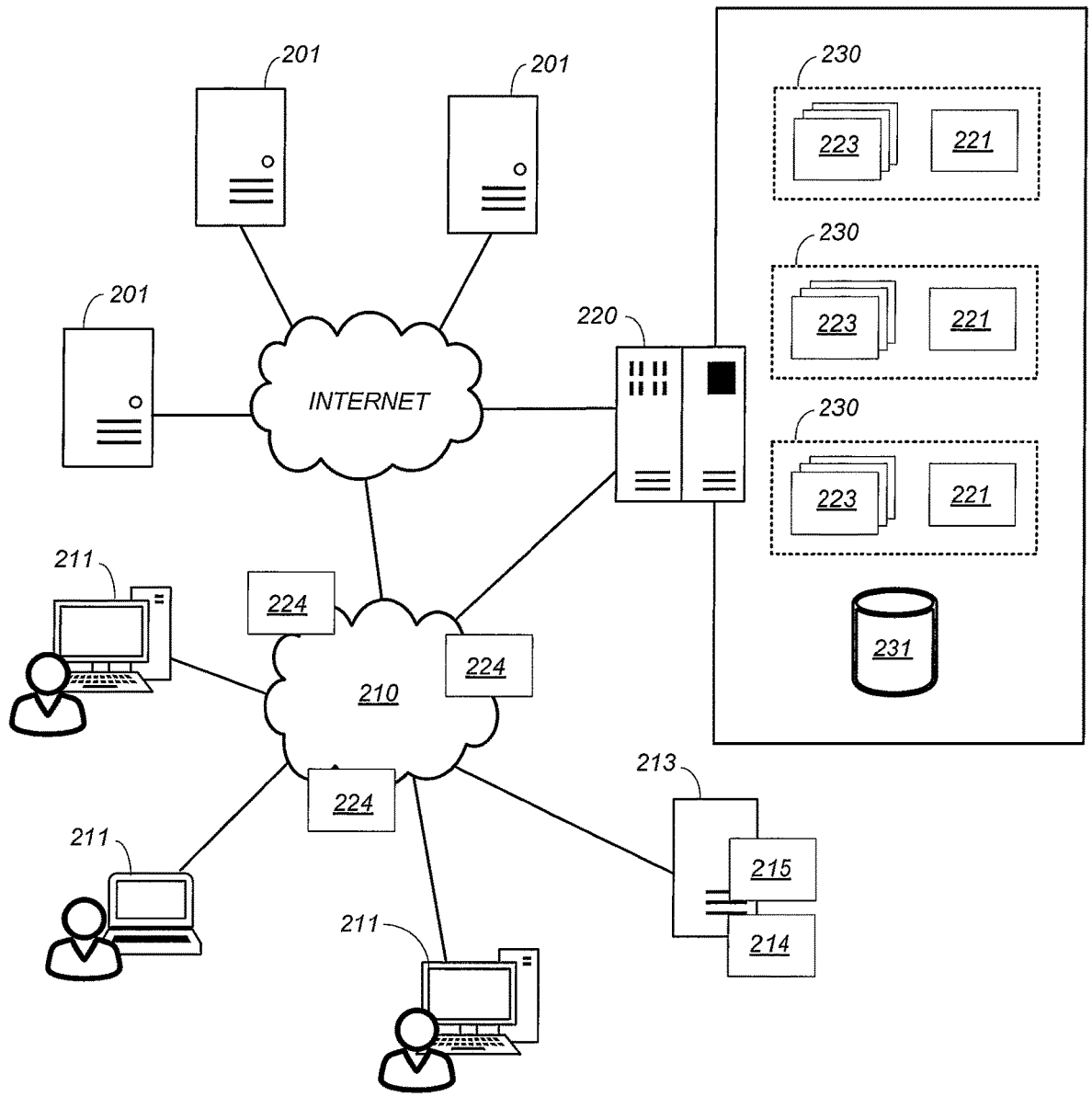
FIG. 1 shows a logical diagram of a private computer network in accordance with an embodiment of the present invention.

FIG. 1 shows a logical diagram of a private computer network 210 in accordance with an embodiment of the present invention. The private computer network 210 is that of an organization, such as a private company, government, educational institution, etc. The organization has a plurality of users, each with accounts that have pre-defined permissions to access resources on the private computer network 210 and other resources of the organization. The private computer network includes a plurality of computers 211, which may be desktop computers, laptop computers, server computers, or other computing devices employed by users. The private computer network 210 may further include other computers, such as one or more server computers 213 that provide a service 214 or run an application software 215. In one embodiment, the computers of the private computer network 210 communicate over a Software-Defined Wide Area Network (SD-WAN). As can be appreciated, embodiments of the present invention are equally applicable to other networking architectures.

In the example of FIG. 1, the private computer network 210 is subscribed to a SASE service provided by a backend system 220. The backend system 220 may comprise one or more computers for providing a SASE service in-the-cloud, which in the example of FIG. 1 is over the Internet and the private computer network 210. The backend system 220 may be implemented on an Infrastructure as a Service (IaaS) platform, such as the Amazon™ Web Services (AWS) platform or Microsoft™ Azure platform, for example. The backend system 220 may include a plurality of cybersecurity sensors 224 for collecting information on security events involving entities of the private computer network 210. A security event (also referred to as "event") indicates one or more security risks. The collected information may indicate the users, devices, services, application software, Internet Protocol (IP) address, host names, and other information involved in the security events. The sensors 224 may be deployed at various cybersecurity nodes including Cloud Access Security Brokers (CASBs), Secure Web Gateway (SWG), software-defined (SD) routers, etc. The backend system 220 may include a conventional risk insight system that implements expert rules, machine learning algorithms, and/or other methodologies for detecting and scoring security events based on event data collected by the sensors 224. Event data collected by the sensors 224 may be stored in a database 231, which may be implemented using a data storage device with a suitable data collection and retrieval software.

The backend system 220 may implement a conventional SASE service that is augmented with a plurality of sets of adaptive action components 230. For example, the components 230 may be incorporated in a commercially-available SASE service to facilitate taking of actions against permissions. In one embodiment, an action is a blocking action. In that example, taking an action includes blocking a permission of a user.

A user has an associated user account. In the present disclosure, a reference to a "user" also refers to that user's account or other user identifier. In one embodiment, each user of the private computer network 210 is assigned a set of adaptive action components 230.

In one embodiment, a set of adaptive action components 230 of a user comprises a plurality of prediction models 223, with one prediction model 223 for each event. A prediction model 223 of a particular event of a selected user may be trained using historical event data of the particular event involving the selected user and collected during a time period. The prediction model 223 may be configured to generate a prediction on whether the particular event will occur and/or severity of the particular event if it is to occur. The prediction may be in terms of probability of occurrence, e.g., in the range of 0.00 (the particular event will not occur) to 100.00 (the particular event will certainly occur) and/or predicted risk score. As will be more apparent below, actions to block permissions of the selected user may be taken based at least on predictions made using the prediction models of the user, costs of the events (measure of negative impact on the computer network in general), and costs of taking actions to block the permissions (measure of negative impact on the user). The actions to take against permissions of the selected user may be indicated in an action list 221. More particularly, the action list 221 indicates whether or not an action is taken to block corresponding permissions of the selected user.

FIG. 2 shows a table 250 that illustrates an example correspondence between permissions (p1, p2, p3, . . . , $p_K$) and events (e1, e2, e3, . . . , $e_M$) in accordance with an embodiment of the present invention. The table 250 provides specific examples of permissions and events for illustration purposes only. As can be appreciated. The number and type of permissions and events may vary depending on the particulars of the cybersecurity application.

A permission is an access right that may be granted to a user. In the example of FIG. 2, the following permissions, which are designated as p1-p7, may be granted to a user: (a) "Upload" (permission to upload a data object, e.g., a file, to another computer or website); (b) "Download" (permission to download a data object from another computer or website); (c) "Send Email" (permission to send an email); (d) "Receive Email" (permission to receive an email); (e) "Logon Account" (permission to logon to the user account); (f) "Share" (permission to share a data object or resource with other users); and "Web Connection" (permission to connect to the Internet). For example, a user that has no "Web Connection" permission will be blocked by one or more components of the SASE service from connecting to the Internet. As another example, a user that has no Send Email permission will be blocked from sending an email.

In the example of FIG. 2, the SASE service is configured to detect the following events, which are designated as e1-e9: (a) "Cloud App Reputation" (accessing a cloud application with a bad reputation); (b) "Suspicious Account Activity" (anomalous behavior); (c) "High Risk Account Activity" (risky behavior); (d) "Leaked Account Activity" (leakage of user account information); (e) "Web Suspicious Activity" (suspicious web browsing activity); (f) "Email Suspicious Activity" (suspicious email activity); (g) "Mobile Suspicious Activity" (suspicious activity involving a mobile device employed by a user); (h) Endpoint Suspicious Activity" (suspicious activity involving a computer employed by a user); and (i) "Anomaly Network Traffic" (anomalous network traffic). An event is indicative of a security risk. For example, the Cloud App Reputation event is indicative of security risks associated with cloud applications that are suspicious or have a bad reputation.

Generally, there is a correspondence between events and permissions. That is, several permissions are required for an event to occur. Therefore, an action to block a permission will prevent occurrence of one or more corresponding events. In the example of FIG. 2, a "1" indicates that a permission is a prerequisite to a corresponding event. For example, for the Cloud App Reputation event to occur, a user must have the Upload, Download, Logon Account, and Web Connection permissions. As another example, for the Anomaly Network Traffic to occur, a user must have the Upload and Download permissions.

Figure 3:
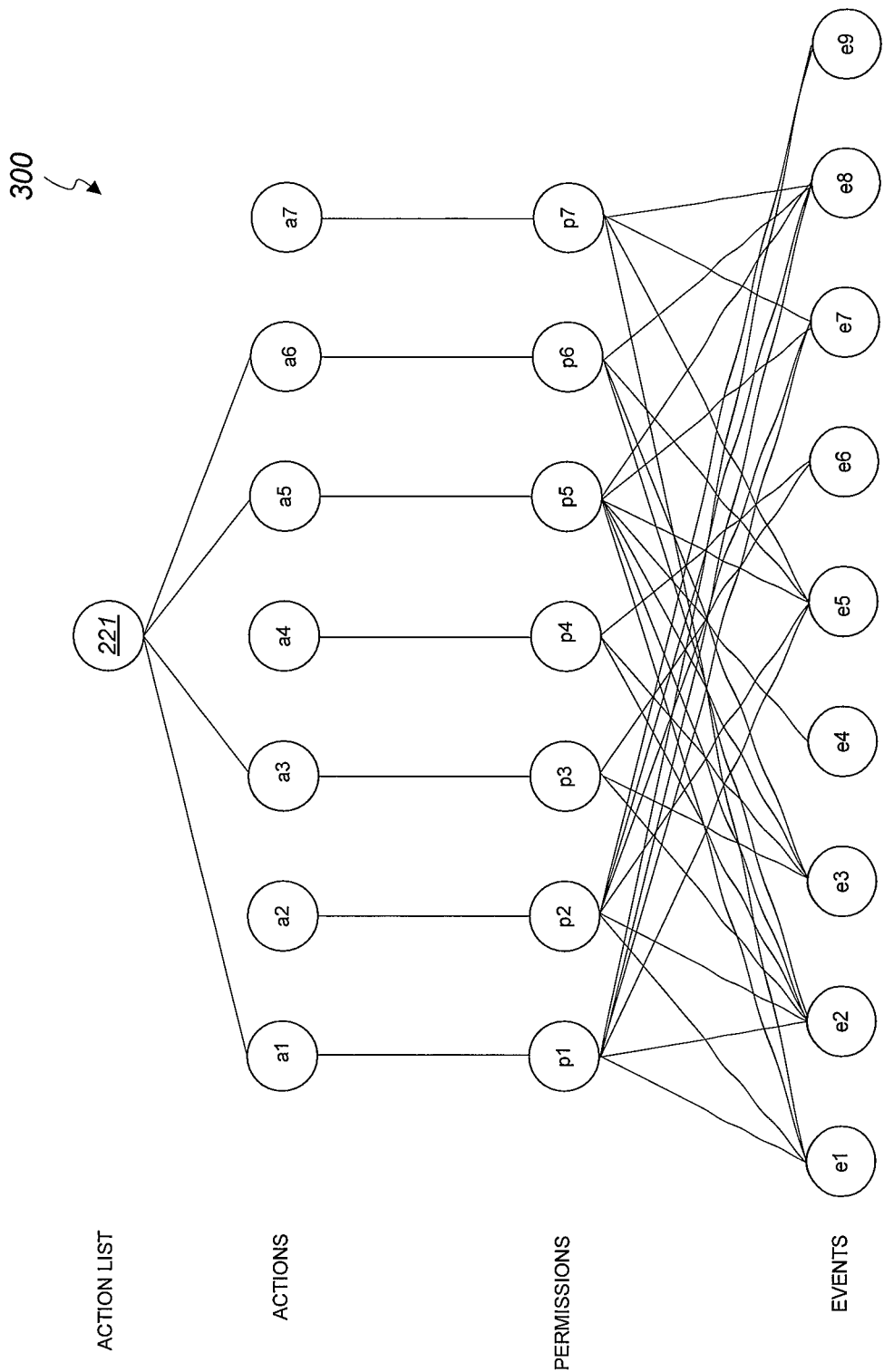
FIG. 3 shows an example connection diagram that represents an action list in accordance with an embodiment of the present invention.

FIG. 3 shows an example connection diagram 300 that represents an action list 221 in accordance with an embodiment of the present invention. The connection diagram 300, in conjunction with the table 250, provides a graphical definition of the relationships between actions, permissions, and events under the SASE service.

In one embodiment, there is a one-to-one correspondence between an action and a permission, i.e., a single action blocks a single permission. In the example of FIG. 3, the actions a1-a7 correspond to the permissions p1-p7, respectively. An action may be taken to block a corresponding permission of individual users. For example, in the example of FIG. 3, taking the action a1 against the permission p1 will block the user from uploading (permission p1), taking the action a2 against the permission p2 will block the user from downloading (permission p2), etc.

There is also correspondence between permissions and events. In the example of FIG. 3, the correspondence between permissions and events are represented as edges (connections). In the example of FIG. 3, the permission p1 corresponds to the events e1, e2, e5, e7, e8, and e9 as per the table 250 of FIG. 2. Accordingly, taking the action a1 to block the permission p1 ("Upload") will prevent occurrence of corresponding events e1 ("Cloud App Reputation"), e2 ("Suspicious Account Activity"), e5 ("Web Suspicious Activity"), e7 ("Mobile Suspicious Activity"), e8 ("Endpoint Suspicious Activity"), and e9 ("Anomaly Network Traffic"). Similarly, taking the action a2 to block the permission p2 will prevent the corresponding events e1, e2, e5, e7, e8, and e9 from occurring as per the connection diagram 300.

As another example, in the example of FIG. 3, the permission p5 corresponds to the events e1, e2, e3, e4, e5, e7, and e8. Accordingly, taking the action a5 to block the permission p5 ("Logon Account") will prevent occurrence of the events e1 ("Cloud App Reputation"), e2 ("Suspicious Account Activity"), e3 ("High Risk Account Activity"), e4 ("Leaked Account Activity"), e5 ("Web Suspicious Activity"), e7 ("Mobile Suspicious Activity"), and e8 ("Endpoint Suspicious Activity").

For each user, whether an action is taken or not against a permission may be indicated in the user's action list 221. In the example of FIG. 3, the action list 221 of a user for actions a1-a7 may be represented as:

{1, 0, 1, 0, 1, 1, 0}
where action a1=1 (block), action a2=0 (not block), action a3=1 (block) etc. In this example, the action a1 being set to "1" blocks the permission p1 and the action a3 being set to "1" blocks the permission p3 of the user. The action list 221 indicates whether or not an action to block is taken against a corresponding permission.

Taking an action against a permission has an associated cost in terms of negative impact to a user. The cost of an action (also referred to as "action cost"), which is a measure of the negative impact, may be defined per permission based on the particulars of the cybersecurity application. For example, the action costs of taking actions a1-a7 to block corresponding permissions p1-p7 in the connection diagram 300 may be defined as follows:

{1/5, 2/5, 2/5, 1/5, 3/5, 1/5, 3/5}
where the cost of action a1 is 1/5, the cost of action a2 is 2/5, etc. In this example, the cost varies between 1/5 to 5/5, where 5/5 is the highest cost. The higher the cost of the action, the more the action will negatively impact the user (and the more likely the user will complain). As an example, taking the action a1 to block the corresponding permission p1 (Upload) of a selected user as in the connection diagram 300 has a cost of 1/5. In contrast, taking the action a7 to block the corresponding permission p7 (Web Connection) of the selected user as in the connection diagram 300 has a cost 3/5, which is higher because blocking a user's permission to access the Internet will negatively affect the user more than blocking the user's ability to Upload and Download.

Each event has an associated cost (also referred to as "event cost") that reflects the negative impact of the event on the computer network if the event actually occurs. That is, the event cost is a measure of the negative impact on the computer network. For example, in the connection diagram 300, the cost of each of the events e1-e9 may be defined as follows:

{3/5, 4/5, 4/5, 4/5, 4/5, 4/5, 4/5, 3/5, 1/5}
where the cost of event e1 is 3/5, the cost of event e2 is 4/5, the cost of event e3 is 4/5, etc. In this example, the cost varies between 1/5 to 5/5, where 5/5 is the highest cost. The higher the cost of the event, the more the impact of the event. As an example, the cost of the Cloud App Reputation event is 3/5, whereas the cost of the Anomaly Network Traffic event is 1/5. This reflects the impact of accessing a cloud application with a bad reputation compared to an anomalous network traffic as defined for the private computer network.

Whether or not to take an action to block a permission may be adaptively determined based at least on a prediction (e.g., in terms of probability) that an event that corresponds to the permission will occur. More particularly, for each user, a prediction model 223 may be created for each event to generate a prediction as to whether or not the event will occur and/or a prediction of the severity of the event if it is to occur. The prediction model 223 may be created by monitoring and logging the activities of the user, and collecting historical data of events (also referred to as "historical event data") involving the user during a particular time period (also referred to as "data collection period."). For example, given a time point t, the SASE service can get historical event data $\{H_1, \ldots, H_m\}$ ($m \geq 0$) of a particular event involving a selected user. The event data may be different for different events. For example, for Email Suspicious Activity event, the event data may include Uniform Resource Locator (URL) links, URL ranking, sending frequency, character statistics etc. A risk score R may be assigned to the event at that time point. Sorted sequences of historical event data of a particular event for a selected user may be, for example:

TABLE 1

| Time Point | H | | | R |
|---|---|---|---|---|
| 0 | $H_{01}$ | ... | $H_{0m}$ | $R_1$ |
| ... | | | | |
| t − 2 | $H_{(t-2)1}$ | ... | $H_{(t-2)m}$ | $R_{(t-1)}$ |
| t − 1 | $H_{(t-1)1}$ | ... | $H_{(t-1)m}$ | $R_t$ | with the first historical event data being collected at time point 0 and the last historical event data being collected at time point t−1. At each time point, a risk score R is assigned by the SASE service to the particular event.

The historical event data may be formed as a time series of feature vectors data for training a prediction model 223 using a suitable machine learning technique, such as neural networks, ensemble trees, transformers, etc. Given a certain time point t, using the prediction model 223 of an event, a prediction of whether the event will occur and/or prediction of severity of the event (i.e., predicted risk score R) may be generated for future time points (e.g., t+1, t+2, etc.).

The determination on whether or not take actions to block corresponding permissions may be optimized to minimize the negative impact of taking actions against corresponding permissions and minimize the severity of the events corresponding to the one or more permissions if the events actually occur. The following equations may be used in an optimization procedure.

$$P = \{p_1, p_2, \ldots, p_K\} \in \{0,1\}$$

$$A = \{a_1, a_2, \ldots, a_K\} \in \{0,1\}$$

$CA = \{ca_1, ca_2, \ldots, ca_K\} \in [0,1]$ $E = \{e_1, \ldots, e_M\}$ $CE = \{ce_1, \ldots, ce_M\}$ $AP = \{ap_{11}, \ldots, ap_{1j_1}, \ldots, ap_{K1}, \ldots, ap_{Kj_K}\} \in \{0,1\}$ $EP = \{ep_{11}, \ldots, ep_{1i_1}, \ldots, ep_{M1}, \ldots, ep_{Mi_M}\} \in \{0,1\}$ $ap_{ij} = ep_{mn}$ for some $i, j, m, n$ Given K permissions that may be granted to a user and M events that can be detected and recorded, for any selected user, some key variables may be defined as follows.

For a given user, $P = \{p_i\}$ stands for the related permission set of the user. $p_i = 1$ if the $i^{th}$ permission was granted to the user; otherwise $p_i = 0$. Similarly, $A = \{a_i\}$ stands for the related action set of the user. $a_i = 1$ if the $i^{th}$ permission of the user is blocked, or an action is taken to block the permission; otherwise $a_i = 0$.

$CA = \{ca_i\}$ stands for the costs of actions. $ca_i$ is a normalized real number between 0 to 1.

For a given user, $E = \{e_i\}$ stands for the predicted security event set for a future time point. $e_i \geq 0$ if the $i^{th}$ event is predicted to occur with a certain prediction value; otherwise $e_i = 0$.

$CE = \{ce_i\}$ stands for the costs of the events actually occurring. $ce_i$ is a normalized real number between 0 and 1.

AP is the recording of the different permissions each action is configured to block. For example, $\{ap_{i1}, \ldots, ap_{ij_i}\}$ stands for action $a_i$ has $j_i$ permissions. In the present disclosure, we set all $j_i$ to 1, which means $j_i = 1$ for all $a_i$. Each action has one corresponding permission. EP is the recording of the permission sets that each event needs to occur. In other words, without the corresponding permissions, the event cannot occur. For example, $\{ep_{i1}, \ldots, ep_{ij_i}\}$ means that an event $e_i$ needs $j_i$ permissions.

An optimization cost function for determining values of actions and permissions may be defined as:

$$\min_{a_k, p_k} \sum_k ca_k a_k + \sum_m ce_m c_m p_{m1} \ldots p_{mi_m} p_{m1}^0 \ldots p_{mi_m}^0$$

$p_{k1} = 0$ iff $a_k = 1$ or $p_{k1}^0 = 0$

...

$p_{kj_k} = 0$ iff $a_k = 1$ or $p_{kj_k}^0 = 0$ $\forall k$ $p_{ij} = p_{mn}$ for some $i, j, m, n$ $a_k, p_k = 0$ or $1$ In the above optimization function, $p_{m1}^0 \ldots p_{mi_m}^0$ are known as the current status of permissions of the user, while no extra permissions are applied. A permission is 0 means the permission was not granted to the user, or an associated action to block the permission was previously taken. A permission is 1 if and only if no action to block the permission was taken and the permission was granted as the current status. The optimization function can be further defined as:

$$\min_{a_k, p_k, I_m} \sum_k ca_k a_k + \sum_m ce_m e_m I_m p_{m1}^0 \ldots p_{mi_m}^0$$

-continued $p_{k1} - p_{k1}^0 (1 - a_k) = 0$

...

$p_{kj_k} - p_{kj_k}^0 (1 - a_k) = 0$ $\forall k \leq \sharp(AP)$ $1 - I_m \leq i_m - \sum_k^{i_m} p_{mk} \leq C(1 - I_m)$ $\forall k$ $p_{ij} = p_{mn}$ for some $i, j, m, n$ $a_k, p_k, I_m = 0$ or $1$ where C is a big enough integer, such as 100*M (where M stands for the number of events). In effect, the optimization problem has been converted to a 0-1 planning problem. The above optimization solution can be implemented by a SASE service because the number of permissions, actions, and events is typically limited and not too large. There are different algorithms to solve these kinds of problems, including implicit enumeration method etc. The actions to take on corresponding permissions may thus be determined and incorporated in an action list 221. That is, for a selected user, the action list 221 may indicate whether or not to take an action to block a corresponding permission, for all actions $a_k$ and permissions $p_k$ of the selected user. In marked contrast to actions that are taken based on inflexible and manually-generated rules, the actions of the present embodiments are adaptive in that they are based at least on costs of the actions, costs of the events, and predictions that are made using the prediction models of the selected user.

Figure 4:
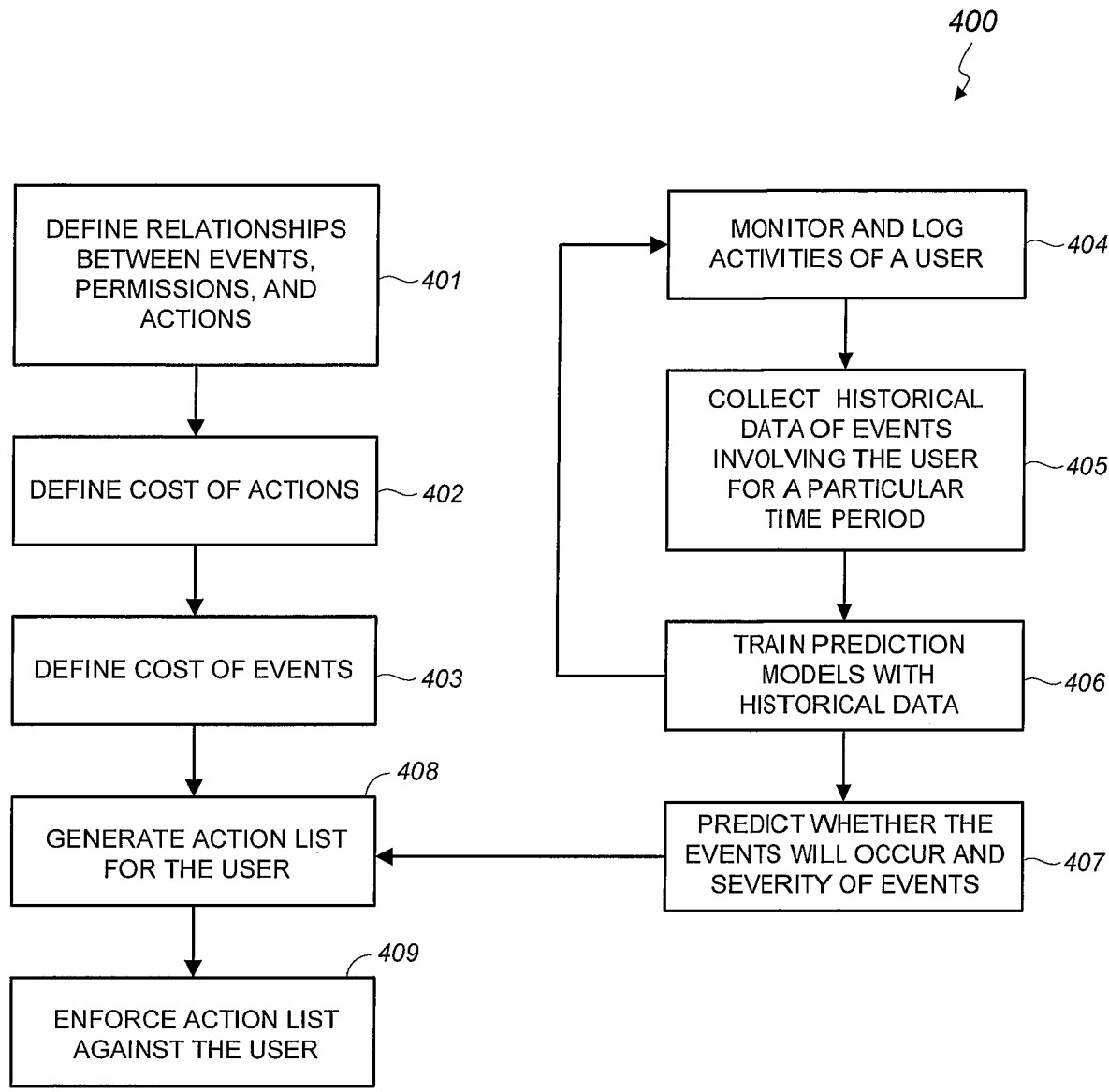
FIG. 4 shows a flow diagram of a method of taking actions to mitigate security risks in a computer network in accordance with an embodiment of the present invention.

FIG. 4 shows a flow diagram of a method 400 of taking actions against permissions to mitigate security risks in a computer network in accordance with an embodiment of the present invention.

In step 401, the relationships between events, permissions, and actions are defined. In step 402, the costs of actions are defined. In step 403, the cost of events are defined. Examples of relationships and costs have been given above for illustration purposes only. As can be appreciated, these relationships and costs may be defined to meet the needs of particular cybersecurity applications.

In step 404, the activities of a selected user are monitored and recorded in a historical database. In step 405, for a particular time period, historical event data of events involving the selected user are extracted from the recorded history of the selected user. In step 406, prediction models are trained using the historical event data of the selected user.

In step 407, event data of the selected user, which are collected after the particular time period, are input to the prediction models of the user to generate predictions as to whether the events will occur and/or predictions of the severity of the events if they actually occur.

In step 408, for the selected user, an optimization step is performed to generate an action list that indicates whether or not to take actions against corresponding permissions of the selected user. In step 409, the action list is enforced against the selected user. For example, if the action list indicates to take an action to block a permission that corresponds to accessing the Internet, the selected user will be blocked from accessing the Internet.

Embodiments of the present invention have been described in terms of users for illustration purposes only. As can be appreciated, embodiments of the present invention are equally applicable to other entities, such as devices, applications, etc. For example, a set of adaptive action components may be assigned to each device of a plurality of devices. In that example, an action list of a selected device of the plurality of devices may indicate actions to take on permissions of the selected device.

Figure 5:
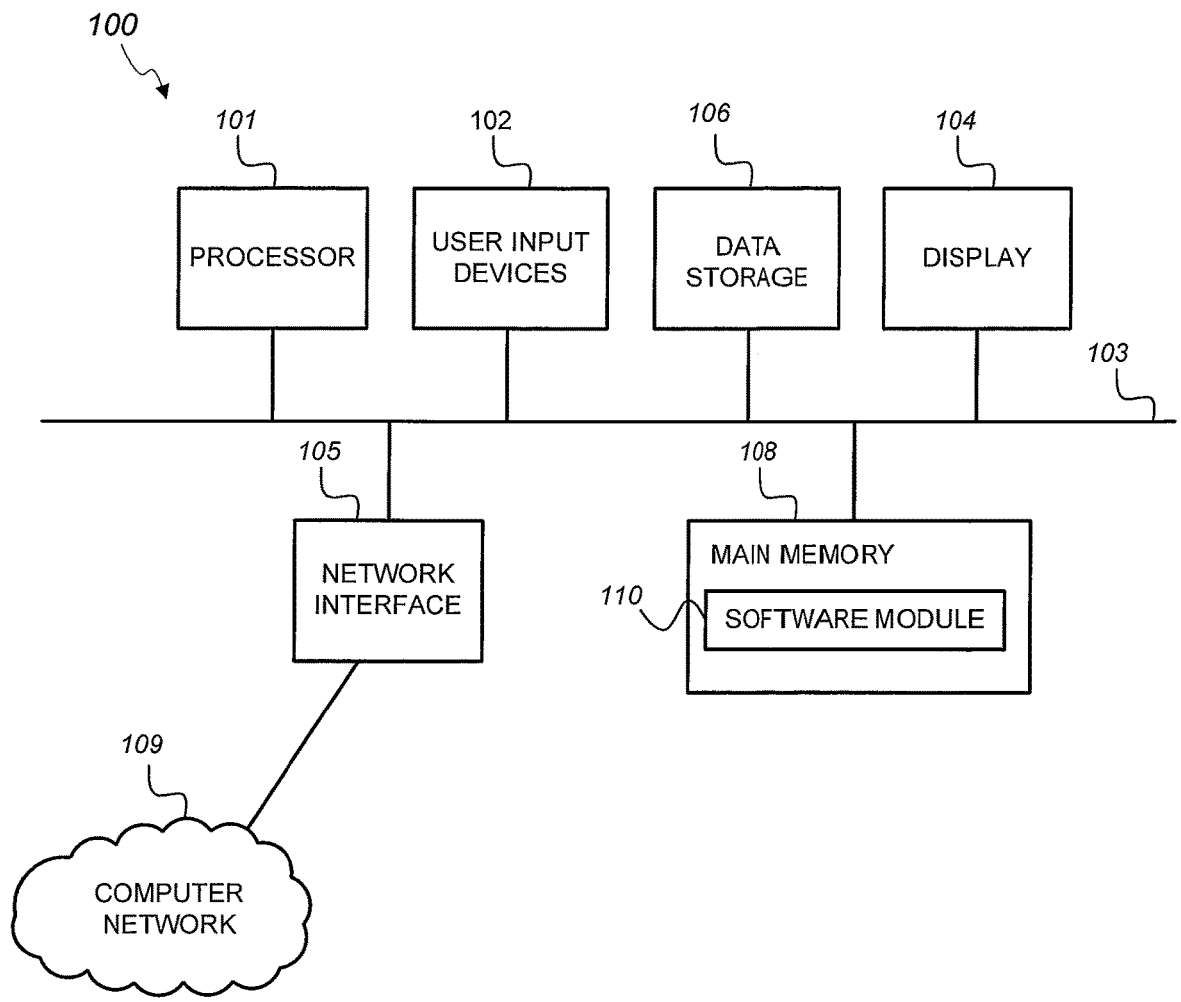
FIG. 5 shows a logical diagram of a computer system that may be employed with embodiments of the present invention.

Referring now to FIG. 5, there is shown a logical diagram of a computer system 100 that may be employed with embodiments of the present invention. The computer system 100 may be employed as a backend system or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In one embodiment where the computer system 100 is configured as a backend system, the software modules 110 may comprise instructions for taking an action to block one or more permissions to mitigate security risks as described herein.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of mitigating security risks in a computer network, the method comprising:
defining event costs of security events that are detected by a cloud-delivered service on the computer network, each of the event costs being indicative of an impact on the computer network of a security risk indicated by a corresponding security event;
defining action costs of taking actions to block permissions granted to users of the computer network, each of the action costs being indicative of a negative impact on a user of taking an action;
for each of the users, creating a prediction model for each security event for generating a prediction as to whether the security event will likely occur;
generating, using a prediction model of a selected user for a particular security event, a prediction as to whether the particular security event involving the selected user will likely occur;
for the selected user, making a determination according to the prediction generated using the prediction model of the selected user as to whether or not to take a particular action to block one or more permissions granted to the selected user based at least on a corresponding event cost of the particular security event, a corresponding action cost of the particular action, and the prediction generated using the prediction model of the selected user; and
blocking the one or more of the permissions granted to the selected user in accordance with the determination, wherein each of the one or more permissions granted to the selected user is an access right of the selected user on the computer network.

2. The method of claim 1, wherein, the prediction model of the selected user has been trained using historical event data of past security events involving the selected user.

3. The method of claim 1, wherein the method is performed by an in-the-cloud Secure Access Service Edge (SASE) service.

4. The method of claim 3, wherein the computer network is a private computer network that subscribes to the SASE service.

5. A computer system comprising at least one processor and a memory, the memory storing instructions that when executed by the at least one processor cause the computer system to:
store definitions of event costs of security events that are detected by a cloud-delivered service on a computer network, each of the event costs being indicative of an impact on the computer network of a security risk indicated by a corresponding security event;
store definitions of action costs of taking actions to blocks permissions granted to users of the computer network, each of the action costs being indicative of a negative impact on a user of taking an action;
for each of the users, train a prediction model for each security event for generating a prediction as to whether or not the security event will likely occur;
generate, using a prediction model of a selected user for a particular security event, a prediction as to whether the particular security event involving the selected user will likely occur;
for the selected user, make a determination according to the prediction generated using the prediction model of the selected user as to whether or not to take a particular action to block one or more permissions granted to the selected user based at least on the prediction generated using the prediction model of the selected user, a corresponding event cost of the particular security event, and a corresponding action cost of the particular action; and
block the one or more of the permissions granted to the selected in accordance with the determination, wherein each of the one or more permissions granted to the selected user is an access right of the selected user on the computer network.

6. The computer system of claim 5, wherein, the prediction model of the selected user is trained using historical event data of past security events involving the selected user.

7. The computer system of claim 5, wherein the computer system is that of an in-the-cloud Secure Access Service Edge (SASE) service.

8. The computer system of claim 7, wherein the computer network is a private computer network that subscribes to the SASE service.

* * * * *